US012345554B2

(12) United States Patent
Huang et al.

(10) Patent No.: US 12,345,554 B2
(45) Date of Patent: Jul. 1, 2025

(54) FIBER IDENTIFICATION WITHOUT CUT POINT USING DISTRIBUTED FIBER OPTIC SENSING

(71) Applicant: NEC Laboratories America, Inc., Princeton, NJ (US)

(72) Inventors: Ming-Fang Huang, Princeton, NJ (US); Philip Ji, Cranbury, NJ (US); Shaobo Han, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 430 days.

(21) Appl. No.: 17/987,805

(22) Filed: Nov. 15, 2022

(65) Prior Publication Data

US 2023/0152130 A1  May 18, 2023

Related U.S. Application Data

(60) Provisional application No. 63/291,567, filed on Dec. 20, 2021, provisional application No. 63/280,715, filed on Nov. 18, 2021.

(51) Int. Cl.
*G01D 5/353* (2006.01)
*G01H 9/00* (2006.01)

(52) U.S. Cl.
CPC ......... *G01D 5/35358* (2013.01); *G01H 9/004* (2013.01)

(58) Field of Classification Search
CPC .................. G01D 5/35358; G01H 9/004
See application file for complete search history.

(56) References Cited

U.S. PATENT DOCUMENTS

| | | | | |
|---|---|---|---|---|
| 11,079,217 | B2* | 8/2021 | Van Putten | A61B 5/065 |
| 11,686,628 | B2* | 6/2023 | Huang | G01K 3/005 |
| | | | | 340/585 |
| 11,885,670 | B2* | 1/2024 | Huang | G01K 11/32 |
| 12,106,664 | B2* | 10/2024 | Ding | G01V 1/30 |
| 2011/0320147 | A1* | 12/2011 | Brady | G01D 5/35361 |
| | | | | 385/12 |
| 2012/0179378 | A1* | 7/2012 | Duncan | E21B 47/008 |
| | | | | 702/8 |
| 2013/0028555 | A1* | 1/2013 | Dailey | G01D 5/35316 |
| | | | | 385/12 |
| 2015/0128706 | A1* | 5/2015 | Godfrey | G01H 9/004 |
| | | | | 73/574 |

(Continued)

*Primary Examiner* — Clayton E. LaBalle
*Assistant Examiner* — Diana Hancock
(74) *Attorney, Agent, or Firm* — Joseph Kolodka

(57) ABSTRACT

Systems, methods, and structures for efficiently identifying individual fibers located in a deployed cable that advantageously reduces laborious field efforts while reducing service outage time. The systems and methods locate a targeted fiber in a cable ("Cable ID") and then identify the targeted fiber ("Fiber ID") by detecting DFOS signal attentions—without cutting the optical fiber. Two distinct determinations may be made namely, Cable ID and Fiber ID. DFOS operation detects vibration signals occurring along a sensor fiber. As implemented, Cable ID is an interactive-machine learning-based algorithm that automatically locates cable position along a sensor fiber route. Fiber ID detects a signal attenuation by bending a group of fibers with bifurcation to pinpoint a targeted individual fiber within a fiber cable.

10 Claims, 16 Drawing Sheets

(56) References Cited

U.S. PATENT DOCUMENTS

| | | | |
|---|---|---|---|
| 2018/0045768 A1* | 2/2018 | Godfrey | G01R 31/1209 |
| 2018/0058982 A1* | 3/2018 | Hartog | G01H 9/004 |
| 2019/0196103 A1* | 6/2019 | Scadden | G02B 6/2553 |
| 2021/0388716 A1* | 12/2021 | Cerrahoglu | G01H 9/004 |
| 2022/0018980 A1* | 1/2022 | Englund | G01H 9/004 |
| 2022/0065690 A1* | 3/2022 | Han | G01D 5/35358 |
| 2023/0024470 A1* | 1/2023 | Huang | G01D 5/35361 |
| 2023/0028676 A1* | 1/2023 | Huang | G01H 9/004 |
| 2023/0152151 A1* | 5/2023 | Li | G01D 5/35361 |
| | | | 73/655 |

* cited by examiner

FIBER IDENTIFICATION WITHOUT CUT POINT USING DISTRIBUTED FIBER OPTIC SENSING

CROSS REFERENCE

This application claims the benefit of U.S. Provisional Patent Application Ser. No. 63/280,715 filed 18 Nov. 2021 and U.S. Provisional Patent Application Ser. No. 63/291,567 filed 20 Dec. 2021 the entire contents of each being incorporated by reference as if set forth at length herein.

TECHNICAL FIELD

This disclosure relates generally to distributed fiber optic sensing (DFOS) systems, methods, and structures. More particularly, it discloses fiber identification techniques without a cut point using distributed fiber optic sensing.

BACKGROUND

To support fifth generation (5G—and later) networks, telecommunications carriers and network service providers have deployed millions of miles of optical fiber cable facilities. To reduce maintenance costs, the deployed telecommunications optical fiber cables oftentimes include tens/hundreds of individual fibers providing a design redundancy. Many of these individual fibers are "dark"—meaning that they do not currently carry telecommunications traffic and such dark fibers are reserved for future usages.

It is critical for telecommunications carriers to be able to locate and identify individual fibers inside a fiber cable when—for example—those individual fibers are going to support new locations or provide new services to existing locations. Oftentimes—but not always—the fiber layout and fiber color codes depend on prior information and knowledge of cable orientation, which can sometimes be acquired from construction maps or notes and photos that are taken manually during the construction. When this prior knowledge is absent or out of date, it becomes challenging for the operators to locate and pinpoint the exact fibers among tens/hundreds/thousands of fibers inside a fiber cable—whether for maintenance purposes or for the purpose of turning up new services. Thus, localizing individual optical fibers inside an optical cable containing many such individual optical fibers is of great industrial importance.

SUMMARY

An advance in the art is made according to aspects of the present disclosure directed to a DFOS technique for efficiently identifying individual fibers located in a deployed cable that advantageously reduces laborious field efforts while reducing service outage time.

In sharp contrast to the prior art, our inventive systems and methods locate a targeted fiber in a cable ("Cable ID") and then identify the targeted fiber ("Fiber ID") by detecting DFOS signal attentions—without cutting the optical fiber.

Operationally, a target fiber end point is identified automatically using an optical power profile analysis technique. A high reflection peak of the target fiber is recorded by analyzing a region near the target fiber end point, which is then used to set an appropriate threshold. The optical power profile is then continuously measured and compared with the threshold in real time to generate a decision as to the specific fiber.

As we shall show and describe, our inventive approach involves two aspects namely: Cable ID and Fiber ID. DFOS operation detects vibration signals occurring along a sensor fiber. As implemented, Cable ID is an interactive-machine learning-based algorithm that automatically locates cable position along a sensor fiber route. Fiber ID detects a signal attenuation by bending a group of fibers with bifurcation to pinpoint a targeted individual fiber within a fiber cable.

BRIEF DESCRIPTION OF THE DRAWING

A more complete understanding of the present disclosure may be realized by reference to the accompanying drawing in which.

DESCRIPTION

Figure 1:
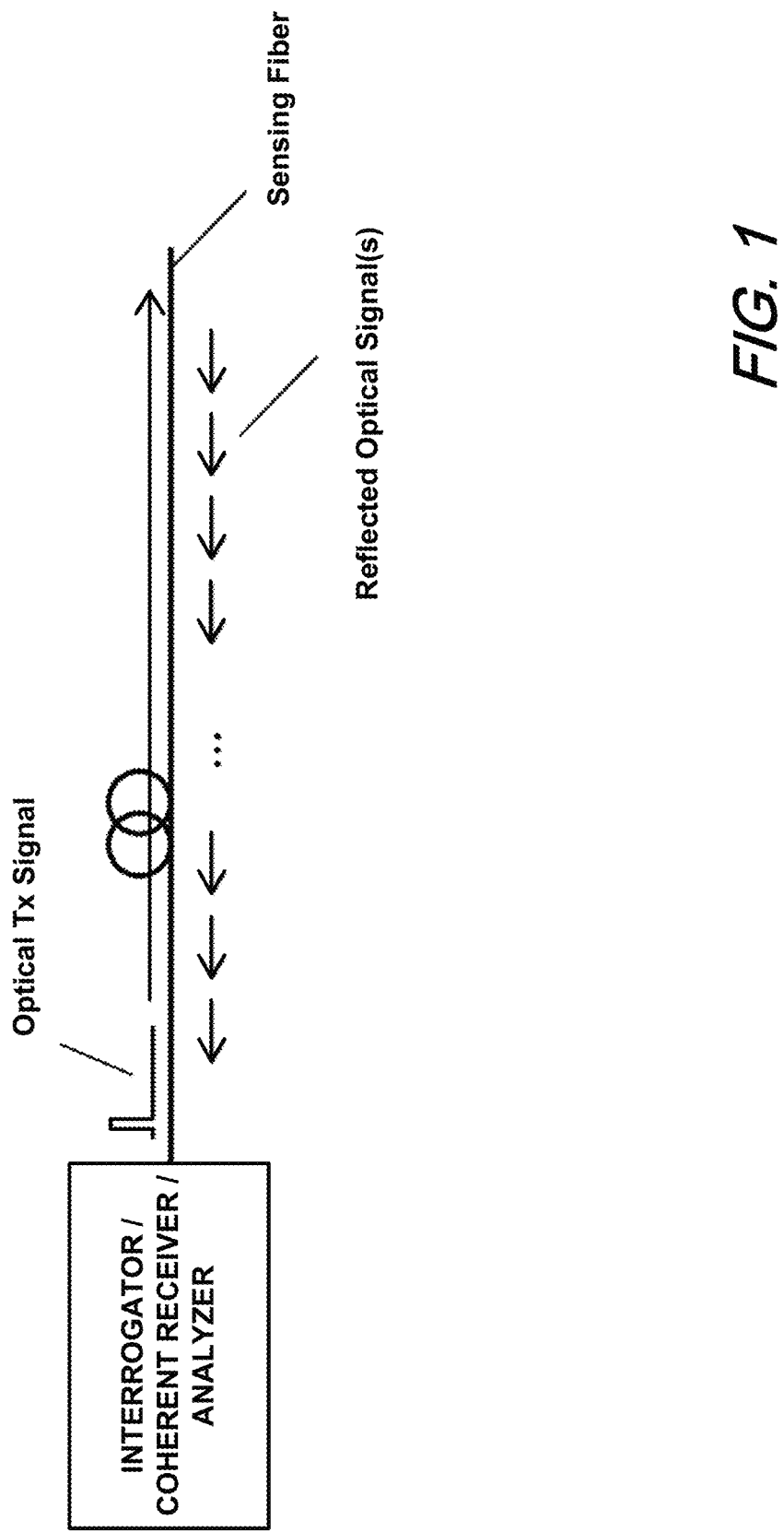
FIG. 1 is a schematic diagram showing an illustrative DFOS system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that distributed fiber optic sensing (DFOS) is an important and widely used technology to detect environmental conditions (such as temperature, vibration, acoustic excitation vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. DFOS can also employ a signal of forward direction that uses speed differences of multiple modes. Without losing generality, the following description assumes reflected signal though the same approaches can be applied to forwarded signal as well.

FIG. 1 is a schematic diagram of a generalized, DFOS system. As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration. While not shown in detail, the interrogator may include a coded DFOS system that may employ a coherent receiver arrangement.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Those skilled in the art will understand and appreciate that by implementing a signal coding on the interrogation signal enables the sending of more optical power into the fiber which can advantageously improve signal-to-noise ratio (SNR) of Rayleigh-scattering based system (e.g. distributed acoustic sensing (DAS) or distributed vibration sensing (DVS)) and Brillouin-scattering based system (e.g. Brillouin optical time domain reflectometry or BOTDR).

As currently implemented in many contemporary implementations, dedicated fibers are assigned to DFOS systems in fiber-optic cables—physically separated from existing optical communication signals which are conveyed in different fiber(s). However, given the explosively growing bandwidth demands, it is becoming much more difficult to economically operate and maintain optical fibers for DFOS operations only. Consequently, there exists an increasing interest in integrating communications systems and sensing systems on a common fiber that may be part of a larger, multi-fiber cable or a common fiber that simultaneously carries live telecommunications traffic in addition to the DFOS data.

Operationally, we assume that the DFOS system will be Rayleigh-scattering based system (e.g., distributed acoustic sensing or distributed vibration sensing) and Brillouin-scattering based system (e.g., Brillouin optical time domain reflectometry or BOTDR) and may include a coding implementation. With such coding designs, such systems will be most likely be integrated with fiber communication systems due to their lower power operation and will also be more affected by the optical amplifier response time.

Advantageously, the DFOS operation may also be integrated together with communication channels via WDM in the same fiber. Inside the sensing fiber, the interrogation sequence and the returned sensing signal may be optically amplified—either via discrete (EDFA/SOA) or distributed (Raman) methods. A returned sensing signal is routed to a coherent receiver after amplification and optical band-pass filtering. The coherent receiver detects the optical fields in both polarizations of the signal, down-converting them to 4 baseband lanes for analog-to-digital conversion (ADC) sampling and digital signal processor (DSP) processing. As those skilled in the art will readily understand and appreciate, the decoding operation is done in the DSP to generate the interrogated Rayleigh or Brillouin response of the fiber, and any changes in the response are then identified and interpreted for sensor readouts.

With such configurations, since the coded interrogation sequence is generated digitally, the out-of-band signal is also generated digitally, and then combined with the code sequence before waveforms are created by a DAC. When generated together digitally, the out-of-band signal will only be generated outside a time period of the code sequence, so when added together, the combined waveform will have a constant amplitude.

As those skilled in the art will understand and appreciate, DFOS/DAS/DVS systems have been shown to detect, record and listen to acoustic vibrations in the audible frequency range.

As previously noted, our inventive system involves at least two inventive aspects namely, Cable ID, and Fiber ID.

Cable ID

Cable ID identifies a targeted cable using artificial intelligence techniques (AI) which distinguishes cable vibratory/shaking events, from other strong vibration signals experienced in the field—which may include aerial cable sections easily influenced by wind—as well as buried cable vibrations produced by road traffic and construction activity. Such cable identification includes classifying buried and aerial sections on-the-fly as a prerequisite step; human-machine input/interaction that removes ambiguity and confirms a targeted signal in real-time; specially designed cable shaking ON detector, which tolerates heterogeneity in shaking habits and response times of different technicians/operators. In addition, a dilation kernel is used to bridge any sporadic vibration points caused by different sensitivities of neighboring sensing points; a specially designed cable shaking OFF detector, which removes any influence of ambient traffic. Since the length of slack cables at different locations can be different—without knowledge of a coil length located inside a manhole/handhole—a window locator finds the location and influence span of the cable shaking events. The window so determined is used for Fiber ID.

Fiber ID

After locating the targeted cable by Cable ID, our inventive method analyzes the power profile of the sensor fiber at a location near the identified cable location to further identify the specific fiber-of-interest. The inventive features include: change of sensor to produce the power profile; set a buffer region and a monitor region from the identified cable position, and record the pre-termination power level in the monitor region; continuously monitor the average power at the monitor region and compare with the pre-termination power level to automatically decide whether the fiber-under-test is the correct fiber.

Real-Time Detection, Interaction, and Feedback

Real-time interactive operation of our method provides guidance to field technicians in a timely manner.

Figure 2A:
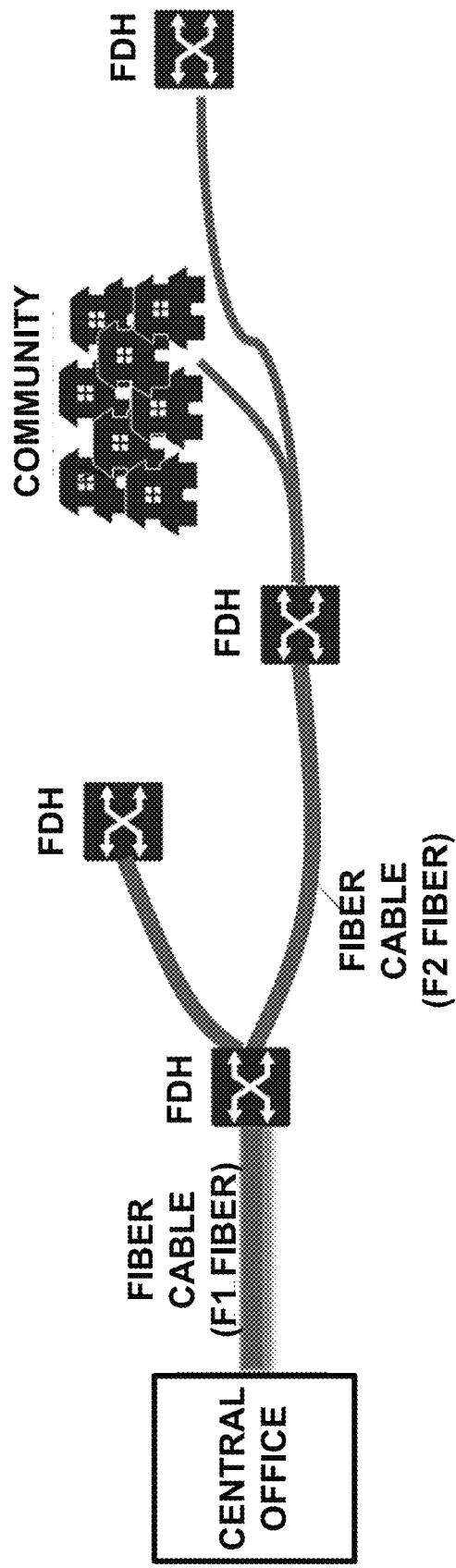
FIG. 2(A) and FIG. 2(B) are schematic diagrams showing illustrative issues associated with locating a target fiber of a deployed fiber cable according to aspects of the present disclosure.
Figure 2B:
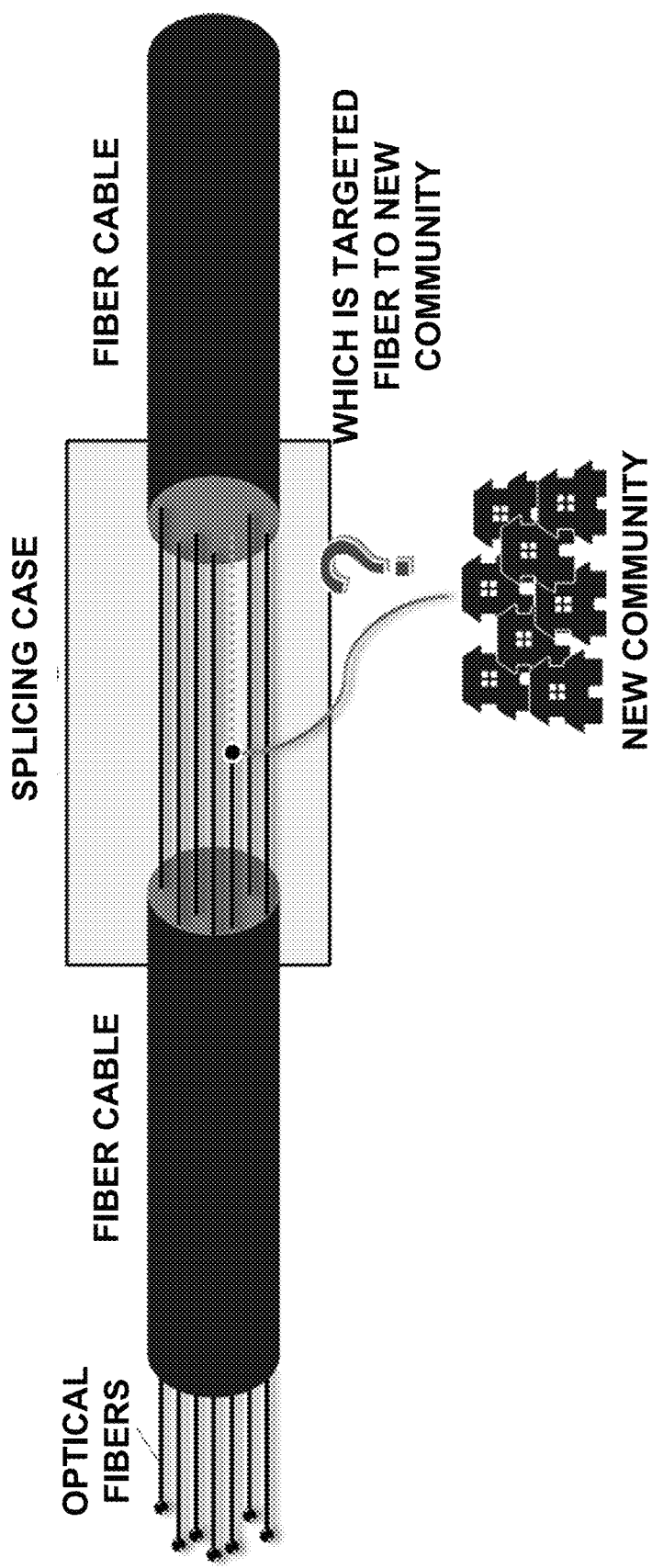

FIG. 2(A) and FIG. 2(B) are schematic diagrams showing illustrative issues associated with locating a target fiber of a deployed fiber cable according to aspects of the present disclosure.

With reference to these figures, it may be observed that in FIG. 2(A), the deployed telecommunications optical fiber cables include F1 fiber (the major fiber cable from the central office) and F2 fiber (drop fiber from FDH (fiber distributed hub)). As will be appreciated by those skilled in the art, there may be hundreds/thousands of individual optical fibers inside a F1 fiber cable and tens/hundreds of individual optical fibers inside a F2 fiber cable. Upon receipt of a request for new service, the telecommunications carrier/service provider must to connect (jump) an optical fiber from a closest jointed location and thereby connect to a new service community as shown illustratively in FIG. 1(B). As will be further appreciated by those skilled in the art, such activity is both difficult and time consuming to locate an individual targeted optical fiber for a new connection.

Figure 3:
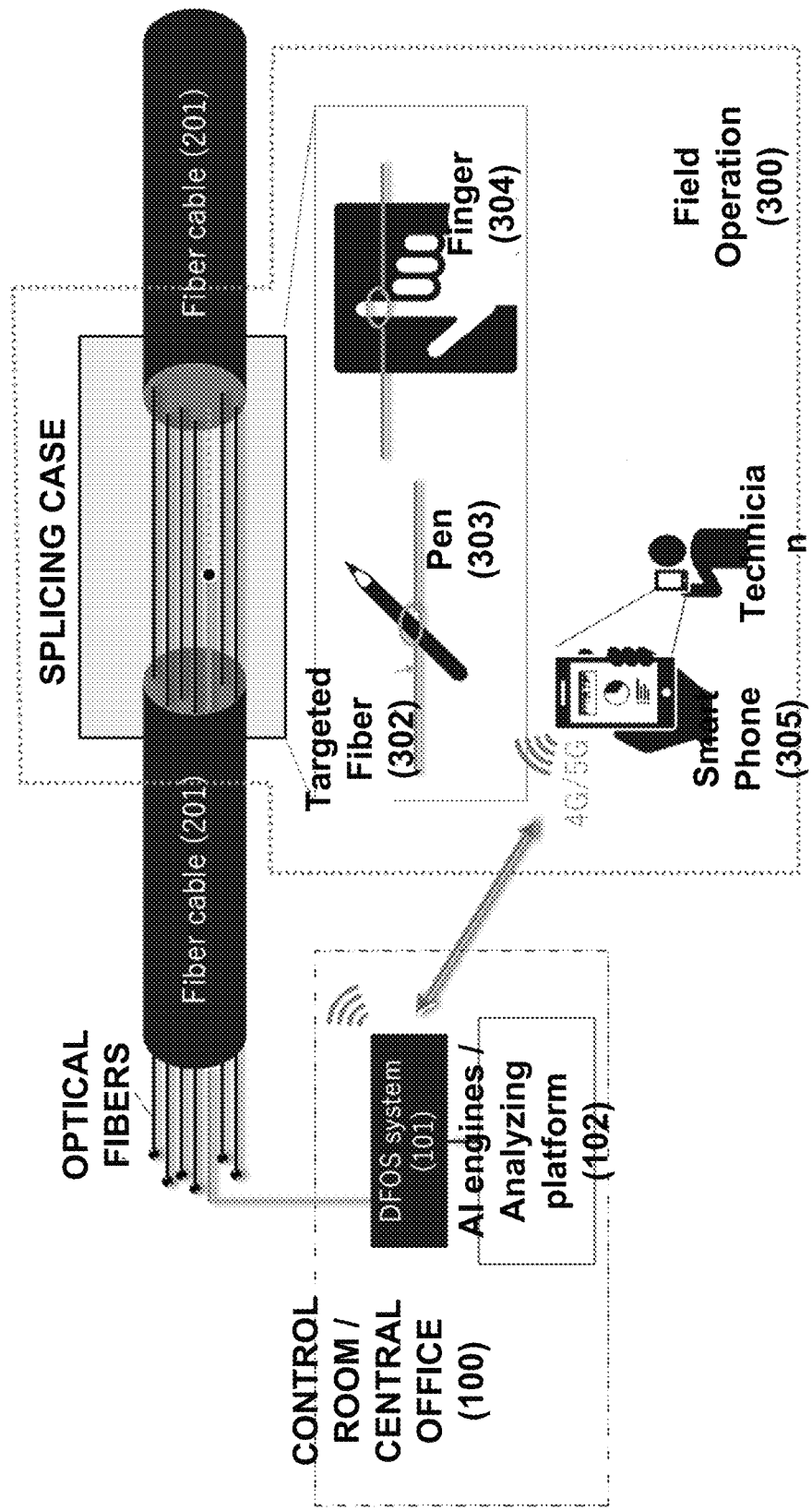
FIG. 3 is a schematic diagram showing an illustrative architectural operation of our method according to aspects of the present disclosure.

FIG. 3 is a schematic diagram showing an illustrative architectural operation of our method according to aspects of the present disclosure.

With reference to that figure, the distributed fiber optic sensing system (DFOS) (101) which can be distributed acoustic sensing (DAS) and/or distributed vibration sensing (DVS) is shown located in a central control office (CO)/remote terminal (100) for real-time, long-term, remote monitoring of an entire cable route. The DFOS system is connected to the field optical sensor fiber to provide sensing functions along the length of the sensor fiber. Advantageously, the optical fiber used for sensing can be a dark optical fiber or an operational optical fiber that carries telecommunications services provided by one or more service providers.

Once the new service request is received, the following procedure occurs.

Step—1: Connect the Fiber to DFOS Systems

The field technician connects the dark fiber or the targeted fiber (the fiber to connect to new community) (202) inside the fiber cable to the DFOS system.

Go to the Field with Mobile Devices

The technician goes to the closest jointed point/splicing box (301) with a mobile device (305) which receives real-time signal analyzing results from the DFOS system (101/102) by—for example—4G/5G signals or WiFi.

Locate the Cable Position in the Field (Cable ID)

To locate the cable position in the field, the technician shakes the fiber cable (201). The DFOS system—in conjunction with human operator input—determines optimum localization results thereby reducing false alarms.

In an illustrative system, two status' states are possible, namely idle and active. When the system is IDLE (default), an unsupervised machine learning algorithm operates and determines which portion(s) of the optical fiber is buried. This is important as the aerial cable sections often exhibit strong vibration signals, which could result in false alarms. During testing, an operator actively switches fiber ports to locate the target cable, so it is important for the system to learn the characteristics of the DAS connected route quickly on-the-fly. When an operator arrives at the field site, the algorithm has already gathered enough evidence to determine which section of the cable is buried. It will return a binary vector as results.

Figure 4:
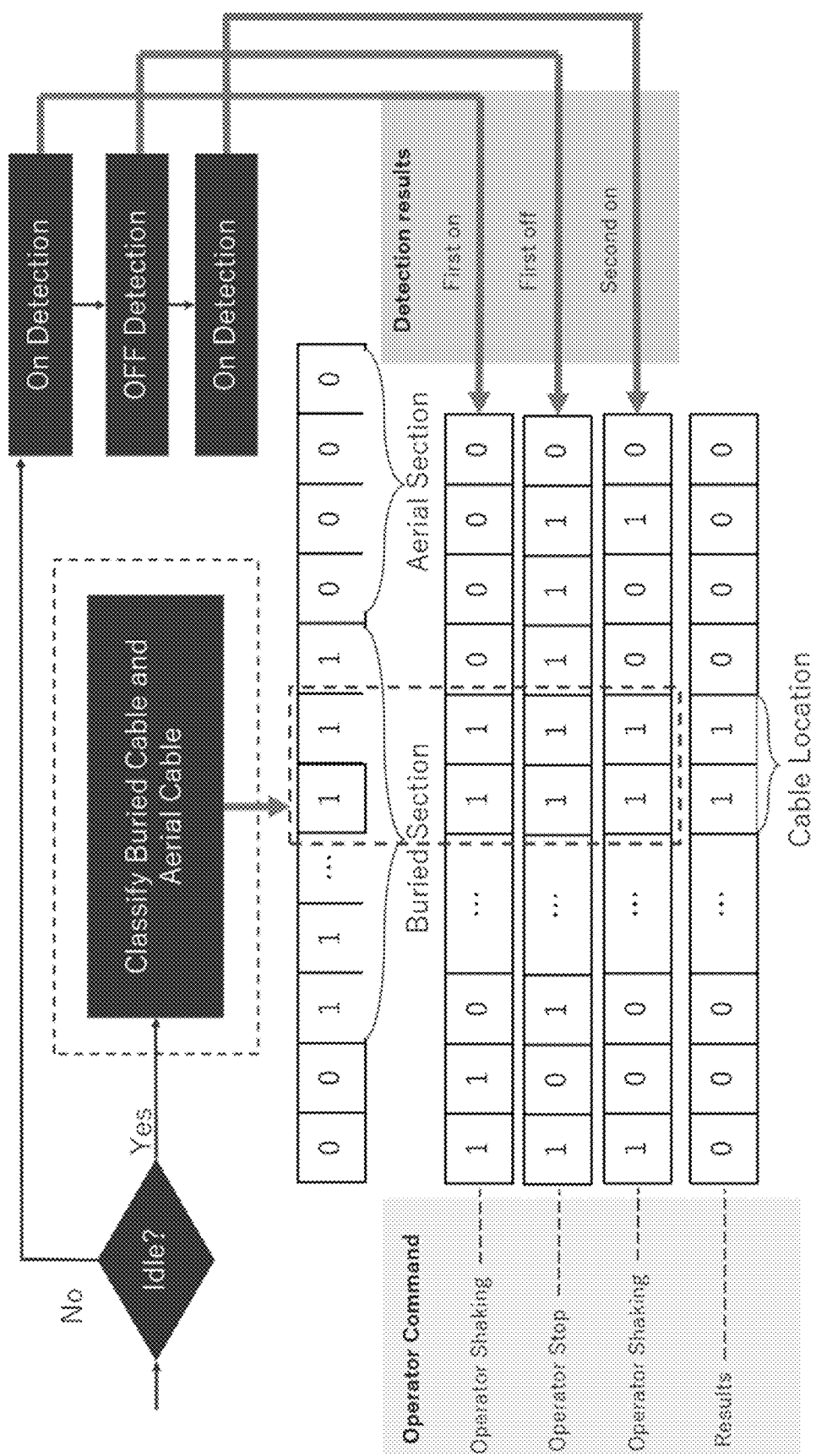
FIG. 4 is a schematic diagram showing an illustrative operational procedure according to aspects of the present disclosure.

FIG. 4 is a schematic diagram showing an illustrative operational procedure according to aspects of the present disclosure.

Once the operator is ready (e.g., opened the manhole/handhole) to perform the test, the system will change its status to ACTIVE, and the operator follows the instructions provided by software to shake the cable. This is designed to be an interactive process between human and machine to distinguish from other strong vibration signals in the field. Initially, the operator is asked to shake the cable during a specific period of time twice and stops in between. The software scans the whole optical fiber cable route, and searches for cable shaking signals from the whole route during all the three periods, returns three binary vectors for the three tests. The correct cable locations must pass all three tests and determined as buried sections. In rare circumstances, if there still exists ambiguity, the system has the option to ask the operator to perform more ON-OFF tests until a single location is found.

Figure 5:
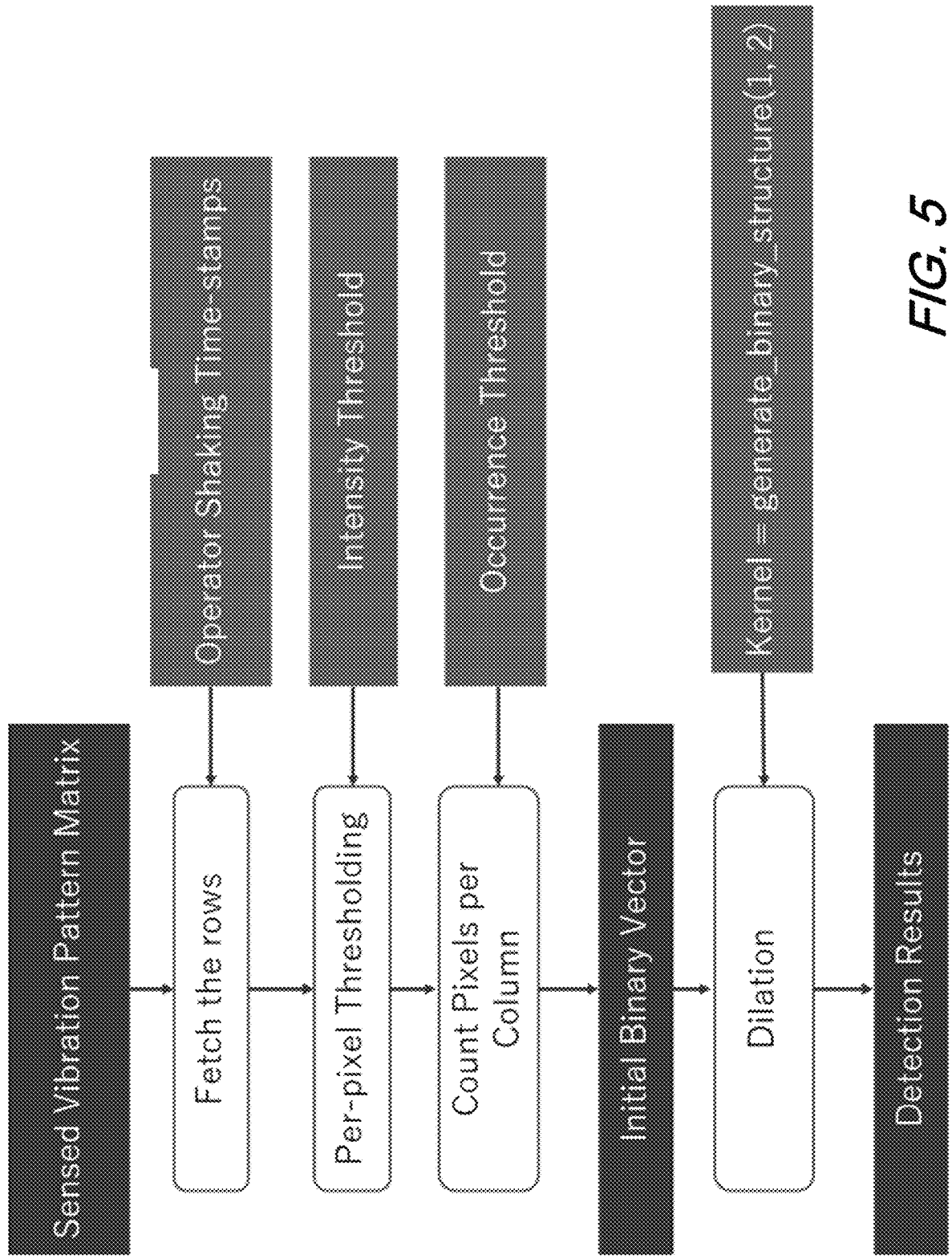
FIG. 5 is a schematic flow diagram illustrating cable shaking ON detector operation according to aspects of the present disclosure.

FIG. 5 is a schematic flow diagram illustrating cable shaking ON detector operation according to aspects of the present disclosure.

Figure 6:
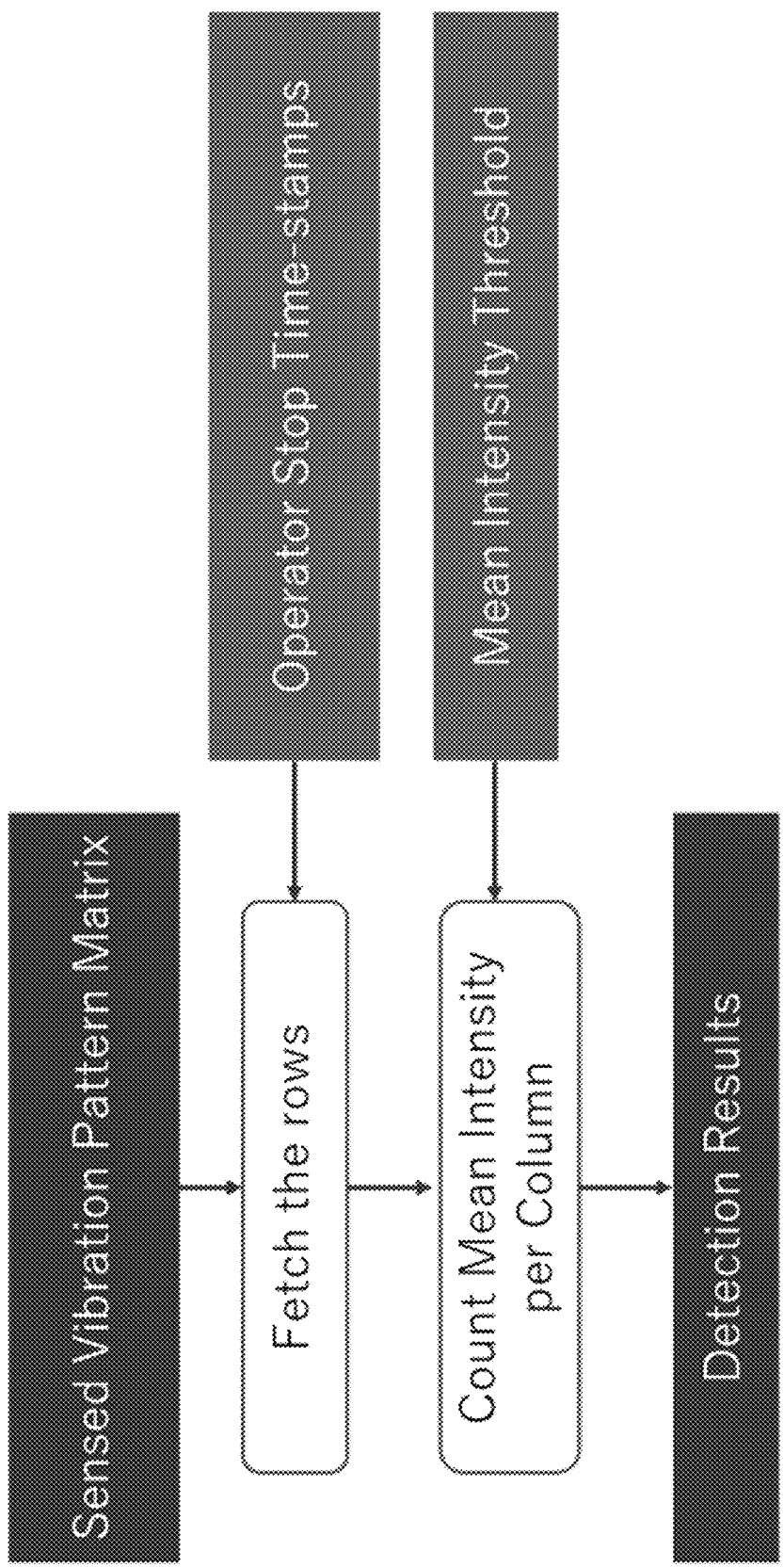
FIG. 6 is a schematic flow diagram illustrating cable shaking OFF detector operation according to aspects of the present disclosure.

FIG. 6 is a schematic flow diagram illustrating cable shaking OFF detector operation according to aspects of the present disclosure.

Cable shaking events usually create the strongest vibration signals within the buried section, repeatedly at the same location, therefore, an intensity threshold and an occurrence threshold can be set. However, due to the inhomogeneous material composition of the fiber and the shape of the cable coil, the response at each location is different. As a result, the strong vibrating patterns in the sensed vibration matrix can be sporadic and discrete. A dilation kernel is applied to the initial binary detection results to remedy this issue.

Figure 7:
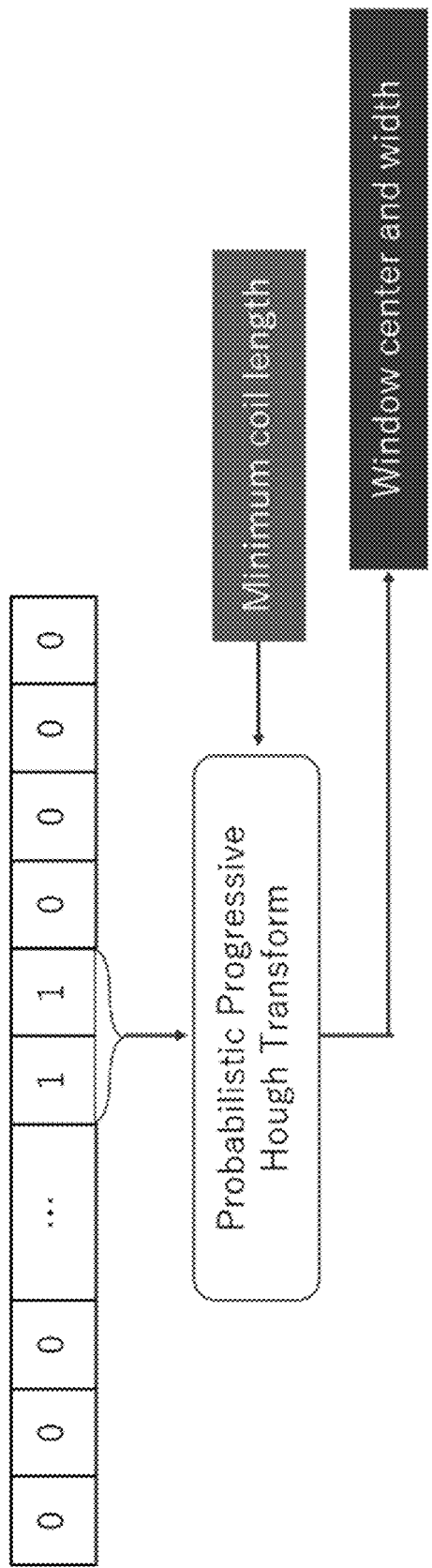
FIG. 7 is a schematic flow diagram illustrating window location finder operation according to aspects of the present disclosure.

FIG. 7 is a schematic flow diagram illustrating window location finder operation according to aspects of the present disclosure. As illustratively shown in FIG. 7, the software reports a window as the cable location, with range covering a set of detected locations that are continuous. Since the length of slack fiber in each manhole/handhole varies, the influence range of cable shaking events is also different. This module is based on applying probabilistic progressive Hough transform to a 1D vector, which merges individual detection results at a few cable locations, into one single window based on the continuity of the binary pattern. The center and width of the detection window corresponds to the cable location and the coil length.

Locate the Targeted Fiber (Fiber ID)

After locating the cable position, the system will switch to Fiber ID mode. The technician needs to terminate the fibers inside the splicing box by using a pen (303) or a finger (304). They can terminate the fibers in groups and narrow down the candidate group and then the targeted one, till the mobile device (305) provides the answer of fiber found.

At this point a series of steps are performed. First, change the sensor setting to output the power profile.

Next—from the identified cable position determined previously—set a buffer region, since the cable that was shaken during the "Cable ID" step is likely not exactly where the splicing case is—although it may be close.

After the buffer region, set a monitor region. Record the average power level of this region as the "pre-termination level".

Instruct the technician to terminate the fibers one by one or in groups. At the same time, continuously monitor the average power level of the "monitor region". If it's below a certain percentage of the "pre-termination level" (say, 20%), it means that this terminated fiber or fiber group is the correct fiber(s) and is identified. Otherwise, it means that the terminated fiber or fiber group is not the correct one, and the technician can move on to another fiber or fiber group, until the correct one is identified.

Connect New Fiber to New Community and Provide the Service

Once the targeted fiber is identified, the technician can cut the fiber and connect to the new community to provide service.

Figure 8:
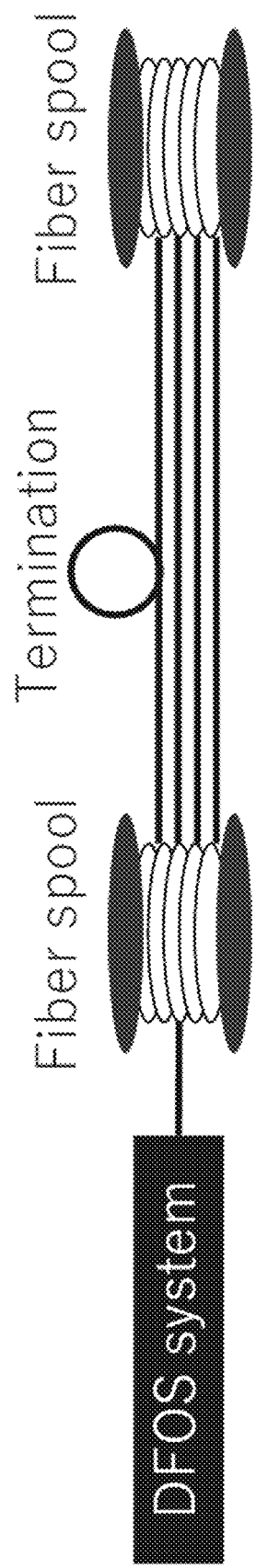
FIG. 8 is a schematic diagram showing an illustrative experimental setup according to aspects of the present disclosure.

An experiment has been done in the lab. FIG. 8 is a schematic diagram showing an illustrative experimental setup according to aspects of the present disclosure. Two 1-km fiber spools are used. There are 4 fibers inside the fiber spool. In order to terminate the fiber one-by-one, the fiber jacket was pulled out for testing. Few scenarios were simulated: (1) no termination, (2) Lose termination and (3) Good termination.

Scenario—1: No Termination

Signals received by DAS when there is no termination at the testing fiber show a continuous signal intensity along the length of the fiber.

Scenario—2: Lose Termination

Signals received by DAS when a lose termination is applied at the testing fiber show a reducing signal intensity at the terminated location.

Scenario—3: Good Termination

Signals received by DAS when a good termination is applied at the testing fiber show a reduced noise level.

Figure 9:
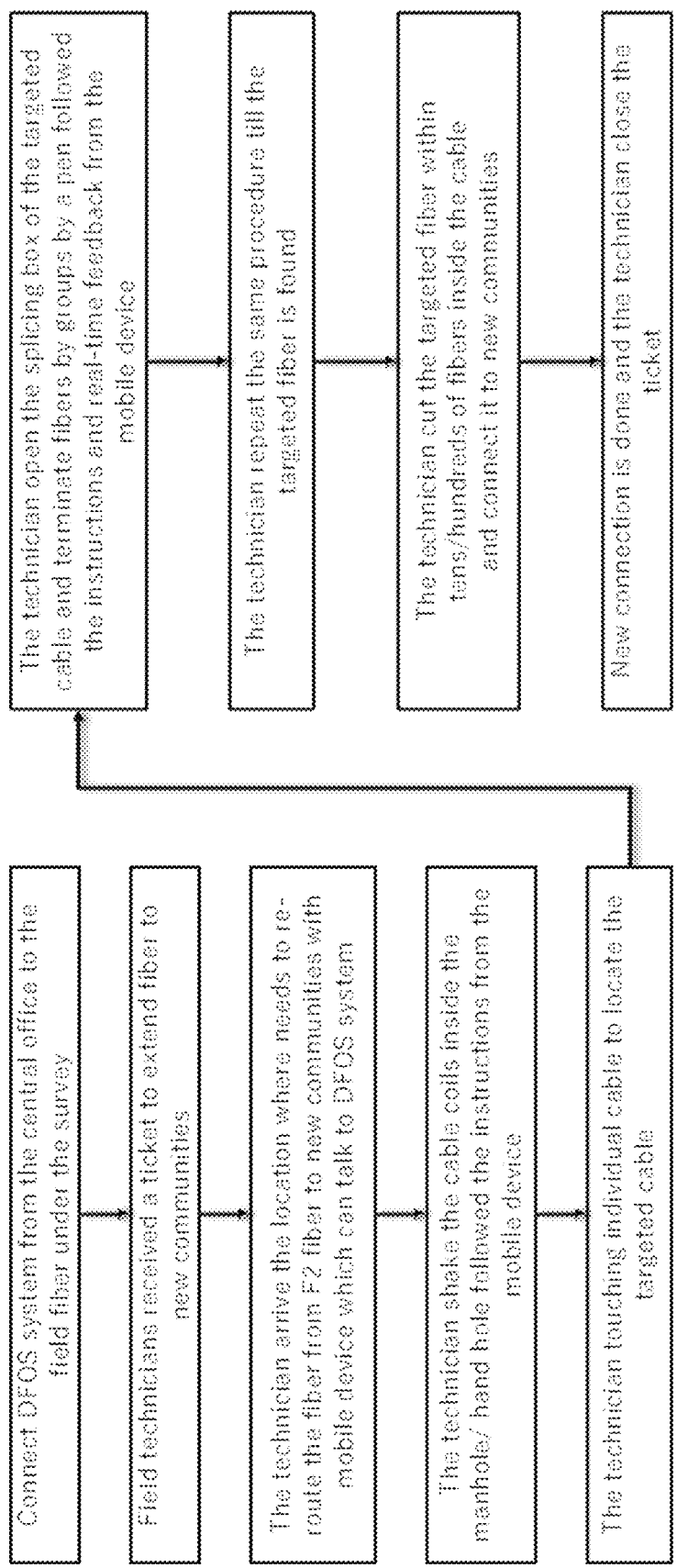
FIG. 9 is a schematic flow diagram illustrating overall operation according to aspects of the present disclosure.

FIG. 9 is a schematic flow diagram illustrating overall operation according to aspects of the present disclosure.

Figure 10:
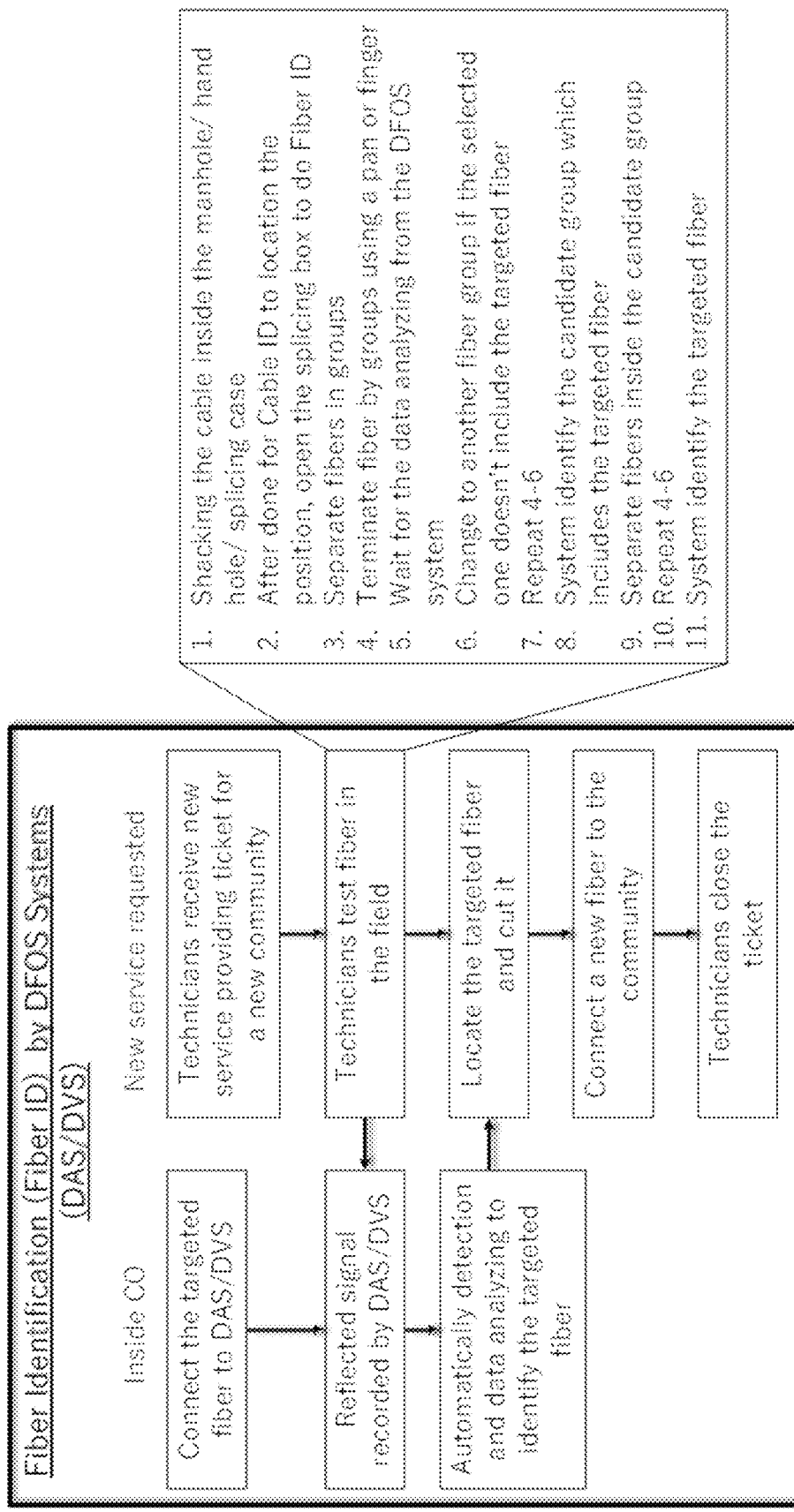
FIG. 10 is a schematic flow diagram illustrating fiber identification by DOFS (DAS/DVS) according to aspects of the present disclosure.

FIG. 10 is a schematic flow diagram illustrating fiber identification by DOFS (DAS/DVS) according to aspects of the present disclosure.

To describe additional applications of our inventive DFOS fiber locating techniques, we note again that there are millions miles of deployed optical fiber in the world. Typically, the optical fiber is spliced and cascaded to reach the targeted location. However, there are tens/hundreds/thousands of fibers in single fiber cable, it is critical to find the targeted pigtails inside the fiber cable when fiber cable was cut. Although the fibers may have color codes, the color may disappear after years (e.g., 20 years) after installation. Sometimes, field technicians need to spend hours to find a single pigtail in order to repair the fiber cut. Thus, finding the fiber pigtail inside an optical cable is of great significance for fiber owners to maintain the facilities efficiently.

An existing method to find a fiber pigtail inside an optical cable involves launching red light into one end of the cable and detecting the signal at a cut point. However, the distance of such method is limited due to signal transmission loss inside the fiber. If a break location is distant from the central office, this method simply does not work.

Another method involves splicing the fiber directly and using OTDR to measure the fiber length. However, it is a time-consuming and inefficient operation.

We now disclose a method for finding fiber pigtails of deployed fiber cables in an efficient way which reduces the laborious field effort. It employs distributed fiber optic sensing (DFOS) systems and produces results in real time.

As we now describe our inventive method uses DFOS to detect signals from an optical fiber open-end point. When an optical fiber cable is cut, the reflected signals are larger than when the fiber cable is uncut due to a ~4% reflection from the air. In this case, the enhanced reflection affects sensing detection at a fiber end location.

As those skilled in the art will understand and appreciate, to locate fiber pigtails located inside an optical fiber cable, some issues need to be solved.

Cable Cut Point Detection

In order to identify the signals, an end point localization AI method is used to locate the fiber end (fiber cut location).

Reducing the Reflected Signals from Fiber Cut Point

Since a larger reflection from an optical fiber open-end will affect the sensitivity of the DFOS, it is necessary to reduce signal reflection. One way to achieve such reduced reflection is to terminate the optical fiber.

Signal Generation at the End Point

To ensure the pigtail is the targeted fiber, a vibration source with designed frequency patterns is used at the fiber end. If the DFOS detects the same frequency patterns, the fiber pigtail is the targeted one.

Real-Time Detection and Feedback

To identify fiber pigtails of deployed fiber in the field, a remote mobile device is employed to provide real-time feedback.

Figure 11:
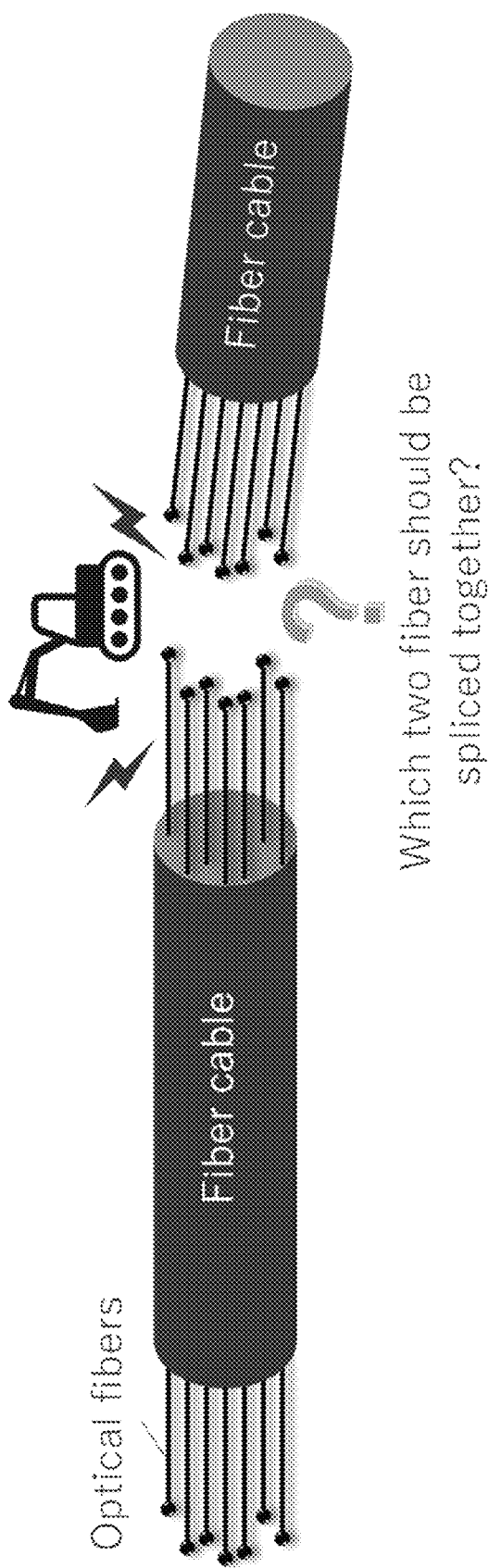
FIG. 11 is a schematic diagram showing illustrative issues associated with cable cut restoration according to aspects of the present disclosure.

FIG. 11 is a schematic diagram showing illustrative issues associated with cable cut restoration according to aspects of the present disclosure.

As noted, and as will be understood and appreciated by those skilled in the art, there are typically tens/hundreds/thousands of individual optical fibers inside an optical fiber cable. Once a cable cut event happens, it is difficult to locate a specific fiber pigtail that requires immediate repair. Oftentimes, it is impossible for field technicians to repair entire fibers at fiber cut point in a short time, as it is a time consuming and tedious operation to splice individual optical fibers—particularly in field conditions. Generally, a technician will attempt to repair a cut fiber according to customer urgency. In such conditions, it is essential to identify a particular fiber pigtail quickly.

Figure 12:
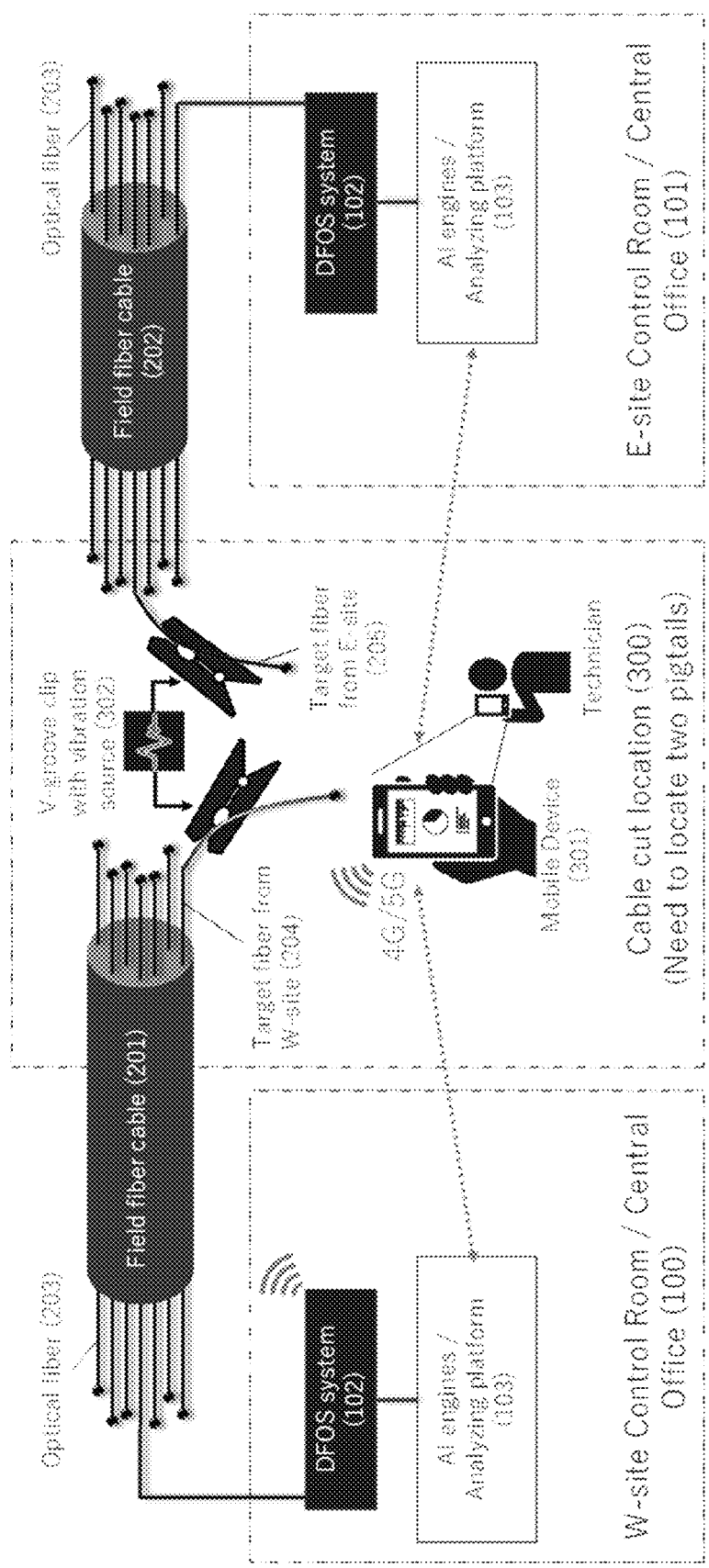
FIG. 12 is a schematic diagram showing an illustrative system layout according to aspects of the present disclosure.

FIG. 12 is a schematic diagram showing an illustrative system layout and exploded view of V-groove clip according to aspects of the present disclosure.

Figure 13:
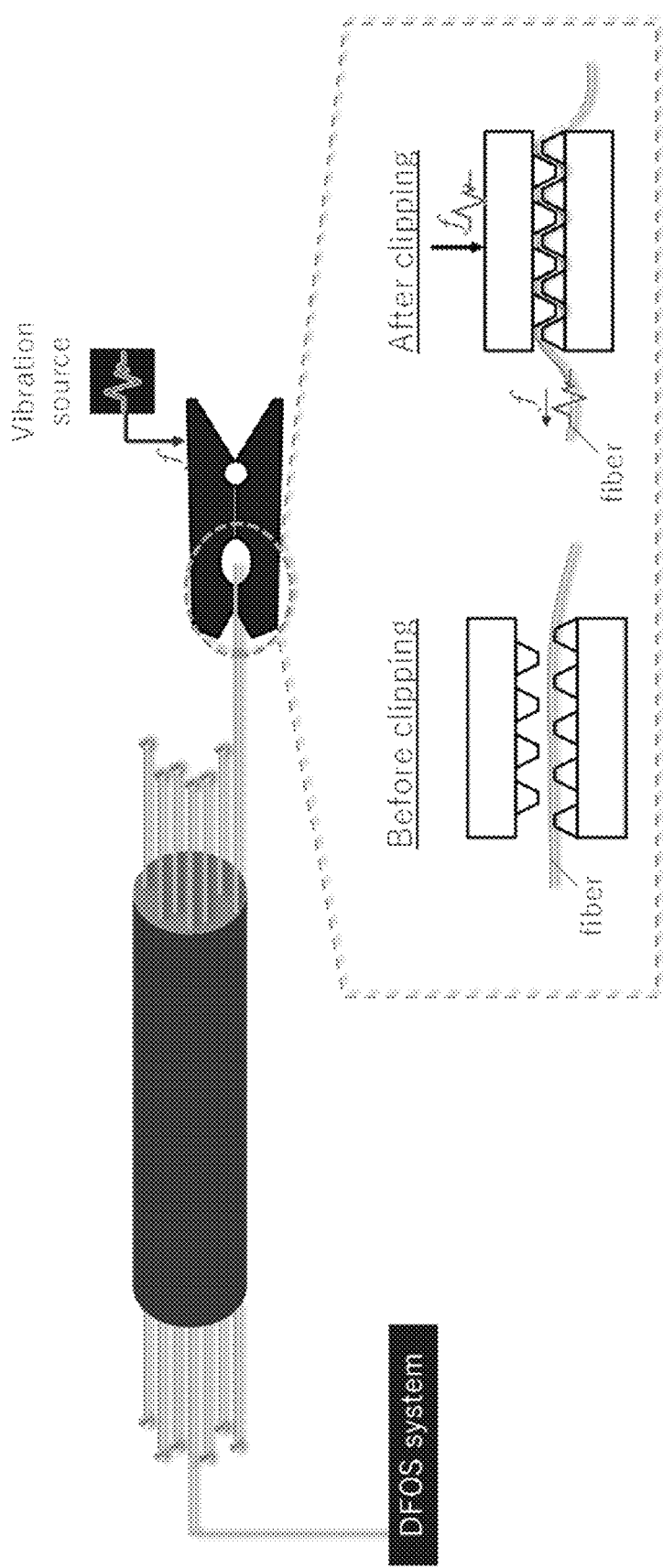
FIG. 13 is a schematic diagram showing an illustrative V-groove clip according to aspects of the present disclosure.

FIG. 13 is a schematic diagram showing an illustrative V-groove clip according to aspects of the present disclosure;

The distributed fiber optic sensing system (DFOS) (101) which can be distributed acoustic sensing (DAS) and/or distributed vibration sensing (DVS) is shown located in a central control office (CO)/central office for remote monitoring of entire cable route. In order to have two directions to find fiber pigtails, the DFOS (101) can be located in W-side CO (100) and moved to E-side CO (101) later, or may include two DFOS systems at 2 COs. The DFOS system is connected to the field optical fiber to provide sensing functions. The fiber can be a dark fiber or operational fiber from service providers.

Once the cable cut event happens the following procedure is enacted.

Connect the Fiber to DFOS Systems from W-Site CO

The field technician connects the dark fiber or the targeted fiber (the fiber needs to repair ASAP due to customer's urgent needs) (203) inside the fiber cable (201) to the DFOS system from W-site CO (100).

Connected the Fiber to DFOS Systems from E-Site CO

If two DFOS systems are available, the technician connects the fiber from the E-site CO (101). If only one DFOS system is available, technicians move the DFOS system to E-site CO after the following 3 steps.

Go to the Field with Mobile Devices

Technicians are deployed to the cable cut location (300) with a mobile device (301) which can communicate and receive real-time signal analyzing results from the DFOS systems (102/103) by 4G/5G signals.

Clipping the Fiber to Find the Targeted Fiber Pigtails

Employing the V-groove clip to clip the fiber pigtails, the V-groove will induce fiber loss and obtain signal termination. Hence, the reflected signals are reduced and the DFOS system sends the results to the mobile device. If the testing fiber pigtail is not the targeted one (connected to the DFOS system), change to another fiber pigtail until the targeted one is identified.

We note that the reflected/scattered signals are significantly reduced after clipping with a v-groove clip. Most of the time, the targeted cable can be identified at this step. However, we can further test to be certain that the clipped pigtail is the targeted one.

Vibration Source

After finding the targeted fiber pigtails (204, 205), the technician turns on the vibration source (302) and generates designed patterns which can be a special frequency tone, a time-sequence patterns or an intensity-sequence signals. This procedure ensures the fiber pigtails are the targeted one needs to repair.

Repair the Fiber

After finding the targeted fiber pigtails (204, 205), technicians splice/repair the fiber to reduce the service down time.

Figure 14:
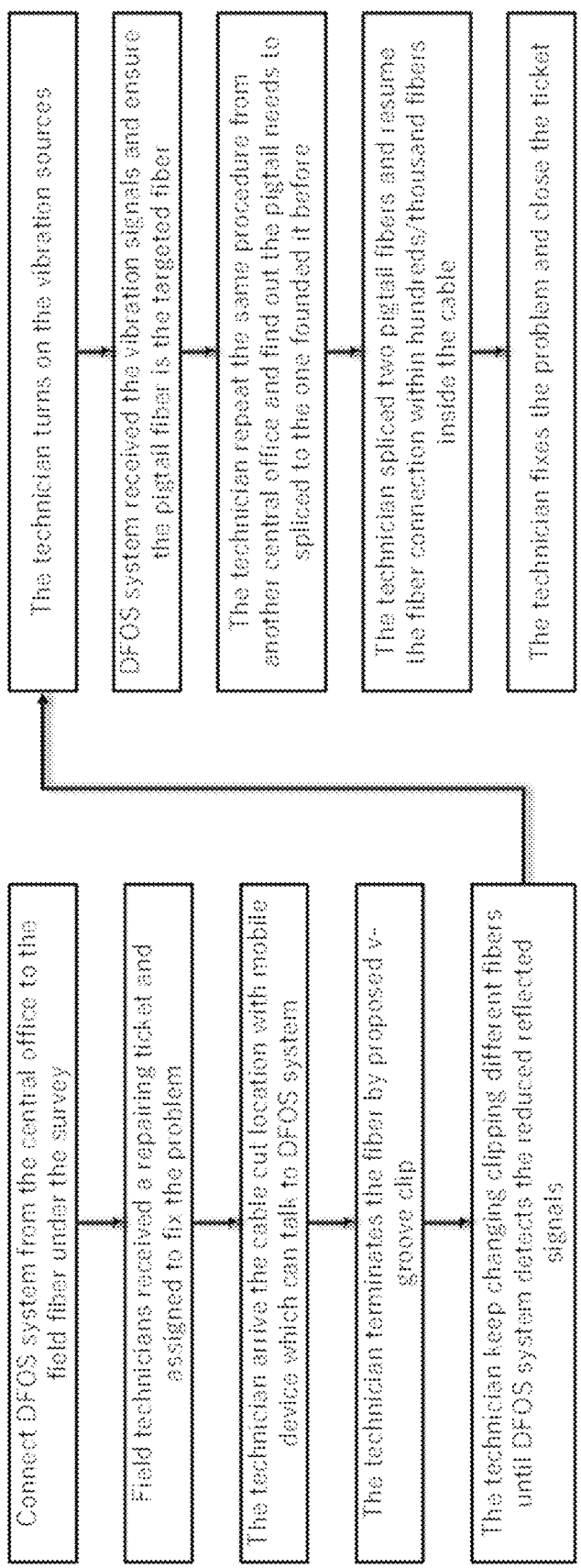
FIG. 14 is a schematic flow diagram showing an overall operation according to aspects of the present disclosure.
Figure 15:
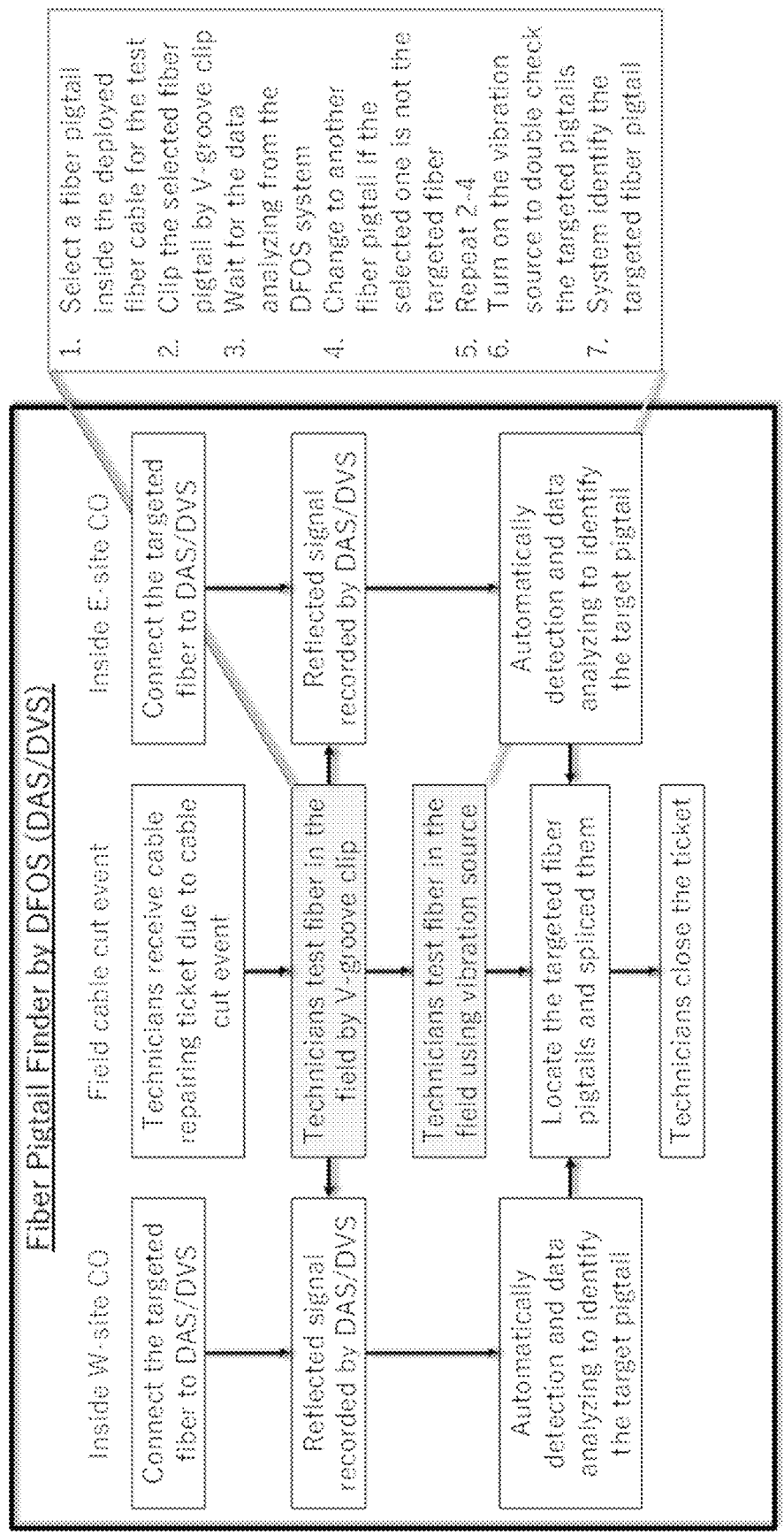
FIG. 15 is a schematic flow diagram showing an overall fiber pigtail finder by DFOS (DAS/DVS) according to aspects of the present disclosure.

FIG. 14 is a schematic flow diagram showing an overall operation according to aspects of the present disclosure; and FIG. 15 is a schematic flow diagram showing an overall fiber pigtail finder by DFOS (DAS/DVS) according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for determining fiber identification using distributed fiber optic sensing (DFOS), said method comprising:

a) providing a distributed fiber optic sensing/distributed vibration sensing system (DFOS/DVS), said DFOS/DVS system including
   a length of optical sensor fiber, wherein the optical sensor fiber is an individual fiber among a plurality of optical fibers in an optical fiber cable;
   a DFOS/DVS interrogator in optical communication with the optical sensor fiber, said DFOS/DVS interrogator configured to generate optical pulses, introduce the generated pulses into the length of optical sensor fiber, and receive backscattered signals from the length of the optical sensor fiber; and
   an intelligent analyzer configured to analyze DFOS/DVS data received by the DFOS/DVS interrogator and determine from the backscattered signals, vibrational activity occurring at locations along the length of the optical sensor fiber;

b) operating the DFOS/DVS system;

c) separating, at a field location, the plurality of optical fibers in the cable into individual groups of optical fibers;

d) mechanically vibrating the individual groups of optical fibers at the field location one-by-one, until a candidate group including the optical sensor fiber is indicated by the DFOS/DVS system;

e) mechanically vibrating individual optical fibers in the candidate group one-by-one, until the optical sensor fiber is indicated by the DFOS/DVS system; and f) identify the indicated optical sensor fiber.

2. The method of claim 1 wherein the field location is a manhole.

3. The method of claim 1 further comprising connecting the indicated optical sensor fiber to a new fiber.

4. The method of claim 1 further comprising terminating the individual groups one-by-one using a human finger.

5. The method of claim 1 wherein one or more of the plurality of optical fibers in the optical fiber cable are broken, and a vibrating clip is attached to a broken end of one of the optical fibers, one-by-one, until the optical sensor fiber is indicated by the DFOS/DVS system.

6. The method of claim 5 wherein the vibrating clip vibrates at a pre-determined vibration pattern.

7. The method of claim 5 further comprising a second DFOS/DVS system at a far end of the optical fiber cable.

8. The method of claim 7 wherein the DFOS/DVS provides an indication of the optical sensor fiber via digital wireless communications to a handheld mobile device.

9. The method of claim 8 wherein the vibrating clip includes a plurality of v-shaped grooves that impart a plurality of mechanical bends in the optical fiber prior to imparting the vibrations.

10. The method of claim 9 wherein the DFOS/DVS provided indication is determined by an artificial intelligence engine included as part of the intelligent analyzer.

* * * * *